J. W. HULL, dec'd.
R. W. PIMM, administrator and A. HULL administratrix, said HULL assignor of one-half interest to J. E. COCHRAN.
Machinery for Operating Pumps.
No. 8,262. Reissued May 28, 1878.
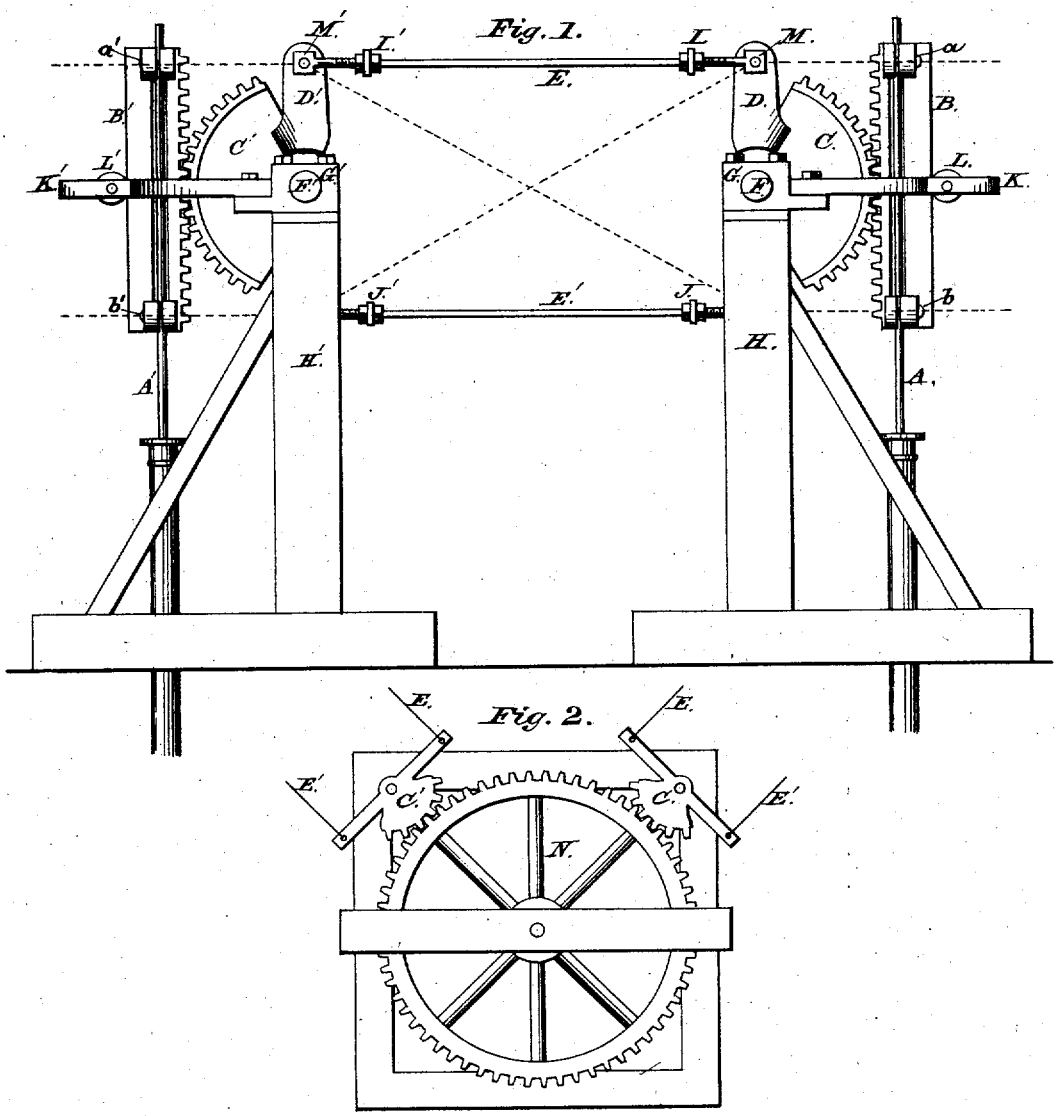
Witnesses:
J. L. Duncan
Wm. L. Lay
Inventor:
Robert W. Pimm admr
& Annie Hull admx
of John W. Hull deceased.
By James E. Boyce
their attorney.
THE NORRIS PETERS CO., PHOTO-LITHO., WASHINGTON, D. C.

UNITED STATES PATENT OFFICE.

ROBERT W. PIMM AND ANNIE HULL, OF FAGUNDUS, PA., ADMINISTRATORS OF JOHN W. HULL, DECEASED; SAID HULL ASSIGNOR OF ONE-HALF INTEREST TO JAMES E. COCHRAN.

IMPROVEMENT IN MACHINERY FOR OPERATING PUMPS.

Specification forming part of Letters Patent No. 175,564, dated April 4, 1876; Reissue No. 8,262, dated May 28, 1878; application filed August 18, 1877.

*To all whom it may concern:*

Be it known that JOHN W. HULL, of Fagundus, in the county of Forest and State of Pennsylvania, did, in his lifetime, invent a new and useful Improvement in the Method of Operating Pumps for Artesian Wells, Mines, &c., of which the following is a description:

This invention is a method of operating pumps located near each other, as in oil-wells, where the power which operates one pump may, by suitable connections, be transmitted to others, so that but one engine or other motive power need be used to drive any number of pumps.

In the accompanying drawing, Figure 1 represents one way of applying the inventor's method.

In said Fig. 1, A represents the piston-rod of a pump. Such a piston-rod is generally called in the oil regions (for use in which this invention is particularly adapted) the "polished rod." To this rod a reciprocating perpendicular motion is given by any suitable means. To the polished rod A the rack B is clamped by screws at *a* and *b*. The rack B is thus adjustable at any convenient part of the polished rod A.

Near the well is firmly fastened the post H. A similar post (not shown in the drawing, as it is obscured by the post H,) is fixed at a proper distance. On these posts are boxes, as shown at G, for the reception of the journal F. Attached to the journal F is the pinion C, provided with two arms, one of which is shown at D.

Fastened to the posts is the frame K, which supports the pulley L. The function of this pulley is to guide the rack B, and keep its cogs engaged with the cogs of the pinion C. It revolves as the rack moves, thus diminishing the friction.

It is evident that as the rod A is moved up and down an oscillating motion will be given to the arm D and to the lower arm. Near the ends of said arm D, and of the other arm are attached to the studs M, or in any other suitable manner, the cables, wires, or rods E and E′. At the points of connection provision is made for the necessary adjusting movement. These rods E and E′ are then carried to and connected with the arms of a similar rack and pinion, B′ C′.

The important element of this invention, which distinguishes it in the greatest manner from all other methods of simultaneously pumping two or more wells, is the double cords E E′, so that the polished rod of the second or subsequent wells are not only raised, but are also depressed, by a positive motion.

When the piston A of the first pump is put in motion, the motion is communicated, through the rack B and pinion C and rods E and E′, to the second rack B′ and pinion C′ and to the piston A′, and the action is reciprocal, so that when A is being drawn up A′ is being drawn down, and vice versa. They thus balance each other; but if it should be desired to have both pumps make the upward and downward strokes together, the cords E and E′ may be crossed, as shown by the dotted lines. In this method the cords E and E′ should be stretched quite tightly from arm to arm, or otherwise the full motion of one arm will not be communicated to the other.

The tension is given to the cords by screws and nuts, as shown at I and J and I′ and J′. These screws and their nuts may be made as long as required for the purpose.

More than two pumps may be attached together by extending the cords E and E′ past the arms D and D′, as shown by the dotted lines, and attaching them to other similar racks and pinions, (crossing the cords when needed to secure a balance,) and thus communicating the power to as many pumps as may be desired, any change of direction being made by rocker-shafts or pulleys. Instead of communicating the power first to the pinion C by the rack B, a horizontal wheel, as shown in Fig. 2, may be used. To the wheel N an oscillating motion is communicated by any power. The wheel may be toothed, and have around its circumference any desired number of pinions, with arms, operating as before described.

What is claimed as new, and desired to be secured by Letters Patent, is—

1. Double wires, rods, or cables connected to arms attached to segment-gears meshing with racks having an alternate reciprocating motion, for the purpose of operating two or more pumps by one motive power.

2. In an arrangement for operating several pumps from one motive power by means of segment-gears acting upon reciprocating racks attached to pump-rods, an adjustable clamp upon the piston-rod, substantially as shown and described.

3. A rack and pinion attached to a piston, connected by cords with another rack and pinion attached to another piston, by which the motion of the first piston is communicated to the other piston, substantially as shown and described, and for the purpose set forth.

4. The combination of the polished rods A and A′, racks B and B′, pinions C and C′, clamps *a b* and *a′ b′*, and cords or cables E and E′, substantially as shown, and for the purpose specified.

ROBERT W. PIMM,
ANNIE HULL,
*Administrators of John W. Hull, deceased.*

Witnesses:
ELLEN C. PIMM,
JOSEPH W. JONES.